United States Patent [19]

Mahaffy et al.

[11] 4,034,536

[45] July 12, 1977

[54] PACKAGING APPARATUS AND TECHNIQUES

[75] Inventors: Reid A. Mahaffy, Montclair; Joel A. Hamilton, Englewood; Wesley W. Pinney, Upper Montclair, all of N.J.

[73] Assignee: Mahaffy & Harder Engineering Company, Totowa, N.J.

[21] Appl. No.: 745,296

[22] Filed: Nov. 26, 1976

Related U.S. Application Data

[60] Continuation of Ser. No. 695,022, June 11, 1976, which is a continuation of Ser. No. 579,939, May 22, 1975, which is a continuation of Ser. No. 427,790, Dec. 23, 1973, which is a division of Ser. No. 258,320, May 31, 1972, Pat. No. 3,805,486.

[51] Int. Cl.² .................................... B65B 31/02
[52] U.S. Cl. ........................... 53/22 A; 53/112 A
[58] Field of Search .............. 53/22 A, 112 A, 184

[56] References Cited

U.S. PATENT DOCUMENTS

| 3,495,992 | 2/1970 | Defor ........................... 53/112 A X |
| 3,533,215 | 10/1970 | Ollier ................................ 53/184 |
| 3,673,760 | 7/1972 | Canamero et al. ........... 53/112 A X |

FOREIGN PATENT DOCUMENTS

| 1,901,219 | 7/1970 | Germany ......................... 53/112 A |

Primary Examiner—Travis S. McGehee
Attorney, Agent, or Firm—Parmelee, Johnson & Bollinger

[57] ABSTRACT

Automatic packaging apparatus and methods for packaging food products such as bacon in evacuated or gas-filled packages. The disclosed machine is capable of convexly thermoforming two webs of packaging material into respective sets of pockets which are brought together in opposed positions to enclose the product. One preferred package made by the disclosed techniques comprises a transparent semi-rigid cup-like shell and a back-formed flexible film sealed over the shell opening. In operation of the disclosed machine, the product is loaded into the semi-rigid package shell from below, so that the upper sides of the product as introduced into the machine are pressed up against the inside surface of the shell, and after evacuation are held in that position by atmospheric pressure acting through the flexible film beneath the product. Thus, such upper sides of the product are visible through the transparent shell which serves as the display side of the package.

10 Claims, 25 Drawing Figures

PACKAGING APPARATUS AND TECHNIQUES

This is a continuation, of application Ser. No. 695,022 filed June 11, 1976 which in turn is a continuation of Ser. No. 579,939, filed May 22, 1975 which in turn is a continuation of Ser. No. 427,790 filed Dec. 23, 1973 which in turn is a divisional of Ser. No. 258,320 filed May 31, 1972, now U.S. Pat. No. 3,805,486.

BACKGROUND OF THE INVENTION

1. Field of the Invention

This invention relates to packaging techniques, and especially to techniques useful in producing vacuum or gas-filled packages for containing food products and the like. More particularly, this invention relates in one principal aspect to improved packaging apparatus and methods suitable for making packages of a class exemplified by the disclosure of U.S. Pat. No. 3,467,244.

2. Description of the Prior Art

A variety of packaging machines have been proposed and used over the past decade or so for vacuum packaging of food products including cheese, luncheon meat, bacon, frankfurters, and the like. The machines which have been used include rotary types, for example as shown in U.S. Pat. No. 2,888,787, and straight-line machines such as are shown in U.S. Pat. Nos. 3,061,984, 3,524,298 and 3,545,163.

The packaging machines available heretofore have not been fully satisfactory. In part, this is because the machines have not been capable of packaging an adequately wide range of products. Special problems are presented in packaging certain products, particularly sliced bacon.

Such problems, for example, stem from the fact that bacon typically is sliced and simultaneously placed in shingled formation by machines having involute-shaped knives rotating on horizontal axes, arranged to cut the bacon from above. In order for these machines to slice bacon cleanly, without tearing or separating fat from lean portions, the knife must enter from the lean (inside) side. Thus, the bacon necessarily leaves the slicing machine with its lean side up, and it has generally been found to be good practice to convey and handle the product with its lean side up, all of the way from the bacon press into the finished package.

Now, it is well established that the final package should be so arranged as to present to the customer a view of the lean side of the bacon, permitting customer inspection of the lean edges of the slices in a neat and uniform disposition. For best presentation, moreover, the display side of the package should be the side which has been thermoformed into a cup-like container for the bacon.

Some packaging machines, even though capable of making the especially preferred semi-rigid bacon package such as shown in U.S. Pat. No. 3,467,244, form the semi-rigid display side downward (i.e., so that the container opening faces up to receive the product). When such machines are used for packaging bacon, the bacon must be inverted before loading, in order to dispose the lean edges against the display side. This inverting procedure has not been satisfactory, particularly due to the dangers of disrupting the shingle arrangement during the loading operation.

SUMMARY OF THE INVENTION

Accordingly, it is one principal object of the present invention to provide a machine capable of producing modern-style bacon packages, as described above, without requiring the bacon rashers to be inverted from the as-sliced, lean-up position to the lean-down position prior to the packaging operations. Other principal objects of the invention include the development of improved facilities and techniques for makinng vacuum and/or gas-filled packages from continuous webs of packaging material.

In a preferred embodiment of the invention, to be described hereinbelow in detail, a packaging machine is provided wherein a continuous web of flexible film is thermoformed downwardly to make a series of upwardly-facing cup-shaped receptacles into which the bacon is loaded from above, lean-side up. The loaded receptacles are moved horizontally to a package assembly station to which also is directed, from a rotary turret above the station, a continuous web of transparent semi-rigid plastic material thermoformed into a series of cup-shaped containers which ultimately will serve as the display side of the packages. These containers enter the assembly station with their openings facing downwards, and mate with the flexible-film receptacles to fully enclose the bacon product. The two webs thereupon are sealed together to form a composite evacuated package wherein the upper (lean) edges of the bacon are forced up, by atmospheric pressure acting through the flexible film, against the inner surface of the semi-rigid container which thus serves to display the lean edges of the bacon to the customer.

To minimize the amount of required thermoforming of the thin, flexible film, that film advantageously may be formed to a depth less than the product height, at least in certain regions. Portions of the product would in these circumstances project above the web line. This however causes no problem in the disclosed machine, because the semi-rigid web is formed on the turret to a depth sufficient to accommodate such product projection. Thus, the unformed flange portions of both webs may be brought together into a common plane, without wrinkling or gathering of either, and may be heat-sealed together so as to effect the overall heremetic sealing of the package. Positive and precise positioning of both webs for high-quality sealing is achieved by the use of two sets of intermeshing web clamps for the two webs, providing close positioning control especially important when making packages with large-area pockets extending across a web having relatively great flexibility.

Other objects, aspects and advantages of the invention will in part be pointed out, and in part apparent from, the following description considered together with the accompanying drawings.

DETAILED DESCRIPTION OF THE PREFERRED EMBODIMENT

Figures 1, 2:
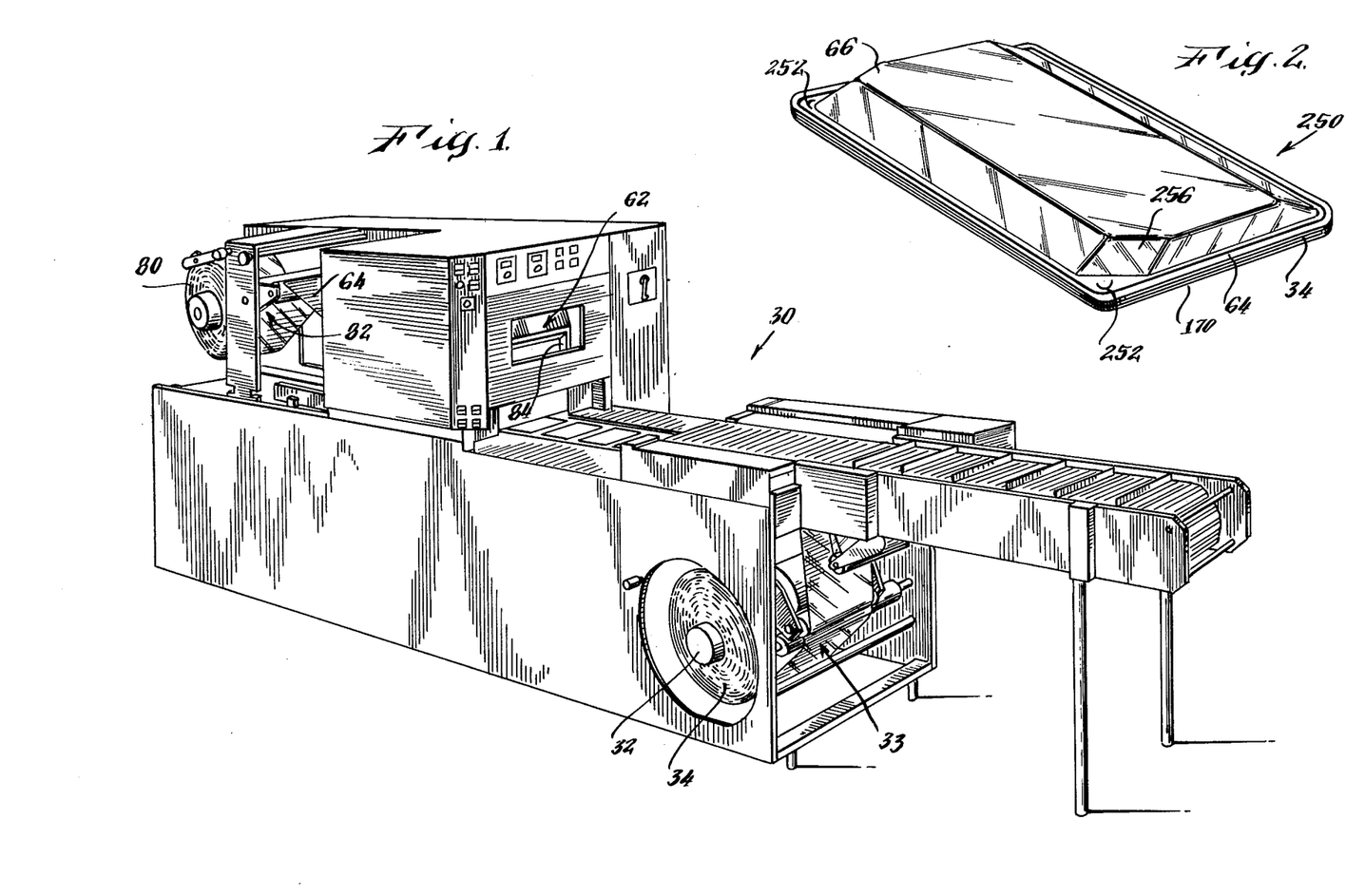
FIG. 1 is a perspective view of a packaging machine constructed as a preferred embodiment of the present invention.
FIG. 2 illustrates one preferred package configuration made by the machine of FIG. 1.

Referring first to FIG. 1, there is shown a packaging machine 30 having a number of synchronized mechanisms which, as will be described, operate in concert to produce a series of packages like that illustrated in FIG. 2. This package is similar in basic respects to that disclosed in U.S. Pat. No. 3,467,244, although certain differences will be noted hereinbelow.

Figure 3:
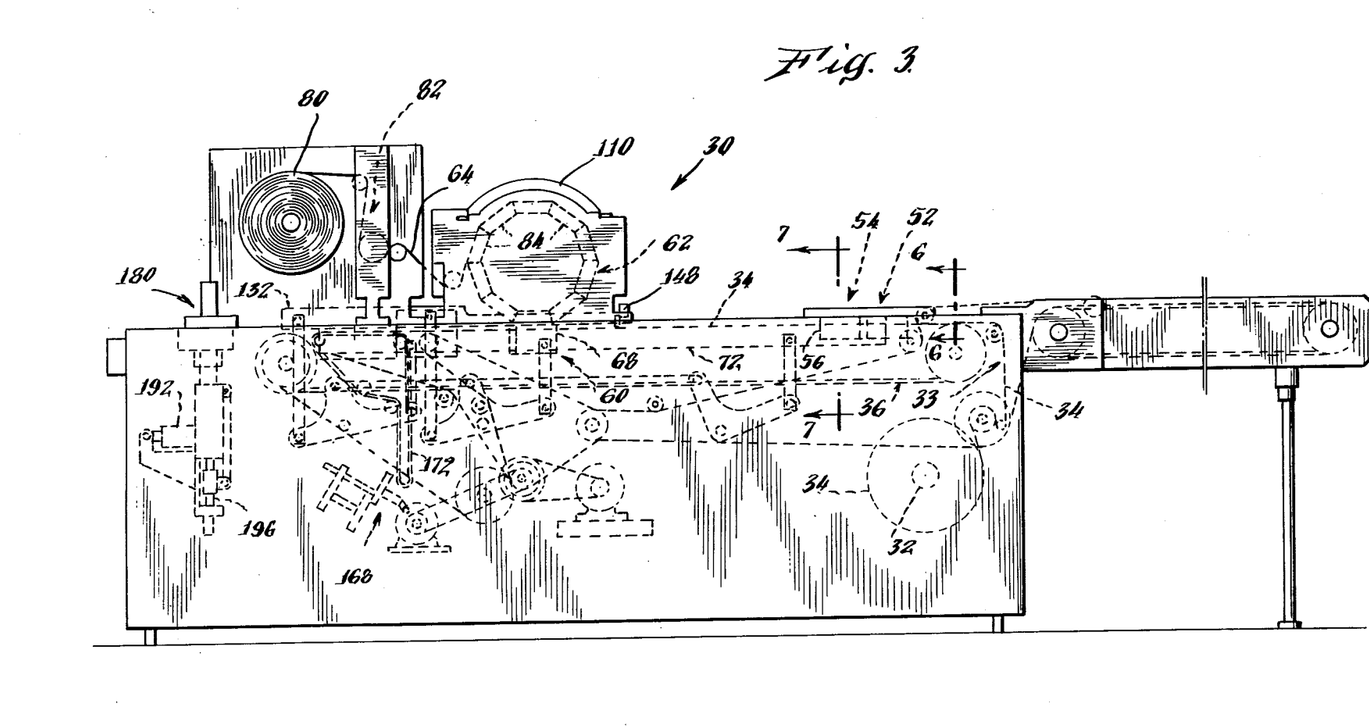
FIG. 3 is an elevation view of the machine of FIG. 1.

The packaging machine 30 is provided in its lower right-hand region with a spindle 32 carrying a roll 34 of relatively thin plastic film of packaging material which is unwound as a continuous web by a conventional web-feed mechanism 33. This plastic film is directed (see also FIGS. 3 and 4) to the upper reaches of an endless-chain conveyor 36 arranged to carry the web with an intermittent indexing motion (to the left in the drawings) past a series of stations where packaging operations are performed during the dwell periods between indexes.

This conveyor 36 comprises two parallel, hollow-roller chains each adjacent one edge of the web 34, and each carrying a series of clamp sets 40 (FIGS. 6 and 8) spaced apart uniformly along the chain. Each clamp comprises spring-loaded jaw elements 42, 43 the tips of which engage to grip the side margins of the web. The cylindrical portions of upper elements 42 are loosely fitted within corresponding hollow rollers of chain 36, permitting axial movement of elements 42 as the clamp is opened and closed.

Figures 6, 7, 8:
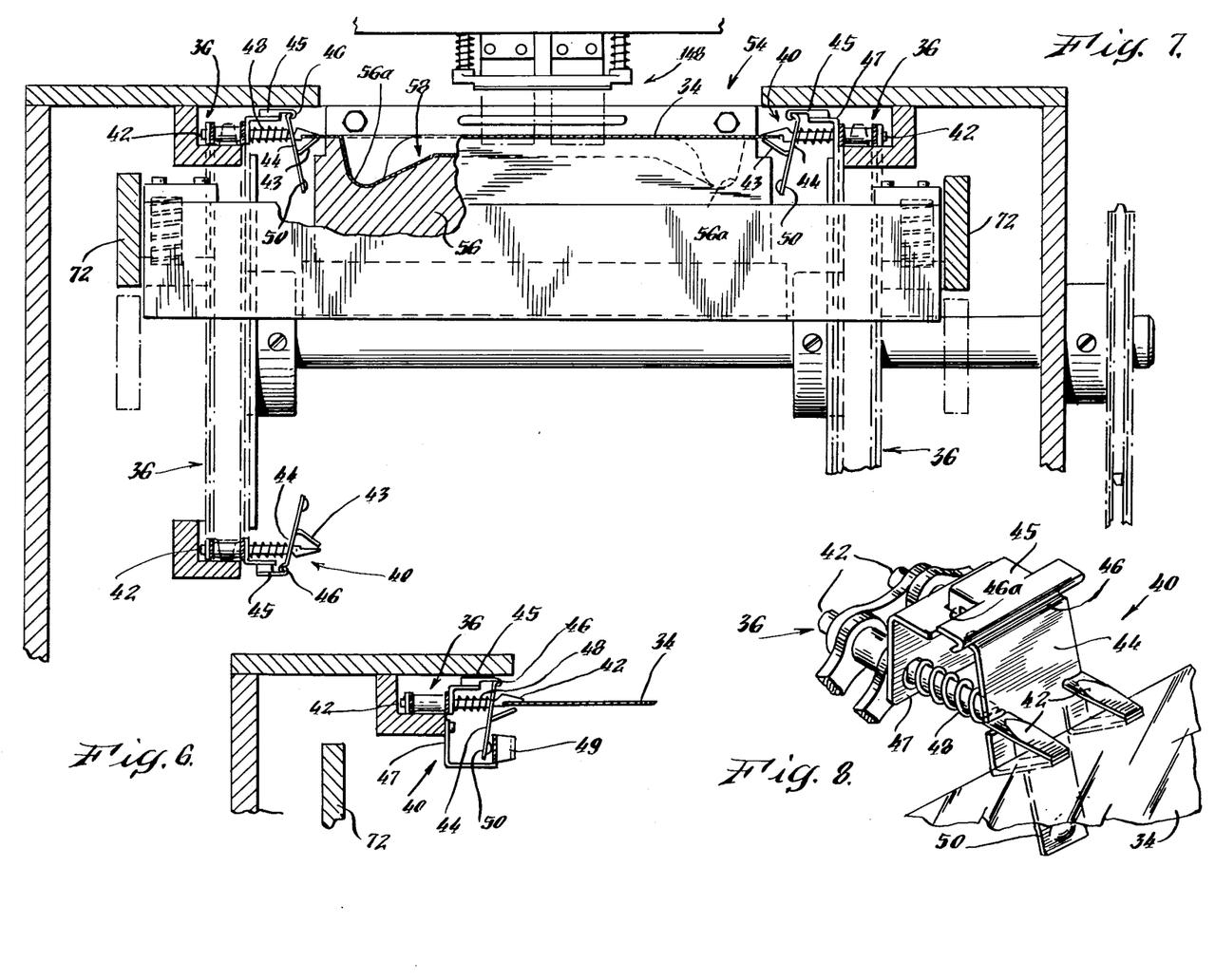
FIG. 6 is a detail section taken along lines 6—6 of FIG. 3, to show the flexible web being applied to the film clamp.
FIG. 7 is a detail section taken along line 7—7 of FIG. 3, to show the forming die for the flexible film.
FIG. 8 is a perspective view of the film clamp.

Pairs of lower elements 43 are integrally formed as part of a rocker plate 44 the top of which is curved to fit into a correspondingly curved support element 45 to define an elongate pivot axis 46 for the rocker plate. Support element 45 is formed with L-shaped tabs 46A which are inserted into a base plate 47 fixedly secured to the chain 36. The elements 42 are grooved on the top to fit with corresponding slots in rocker plate 44, so that elements 42 move horizontally as the plate rotates about its pivot axis. Springs 48 surround elements 42 and urge the plate 44 counterclockwise to tend to hold the gripper jaws shut.

Adjacent the conveyor 36, at a point preceding the point where the web 34 is to be applied, a stationary ramp cam 49 is arranged to engage an arm 50 (forming part of the rocker plate 44) to rotate the plate 44 about pivot axis 46. This shifts the elements 42 towards the chain 36, and also moves the lower elements 43 down and away (referring to FIGS. 6 and 8) to permit the web to slip into position to be gripped by the clamp jaws. The lower elements are moved sufficiently in a lateral direction that the film need not be bent or deflected prior to entry into the clamp.

After the web 34 has been properly positioned, the cam 49 ramps the lower element back against the upper element, tightly gripping the plastic film under the compressive force of spring 48. The jaws grip the plastic film in the plane of the web and thus do not tend to distort the film. This clamp arrangement also is advantageous because it is self-actuating in the sense that any tendency of the film to pull away from the clamp causes the jaws to be forced together and bite the film ever more tightly.

Referring again to FIGS. 3 and 4, and also to FIG. 7, the conveyor 36 carries the web 34 past a two-stage, vertically-reciprocable thermoforming means comprising a heating station 52 and a forming station 54. This thermoforming operation is basically similar to that disclosed in U.S. Pat. No. 3,524,298, and thus will not be described in great detail herein.

To summarize the thermoforming operation briefly, in the heating station 52 a heated platen is brought up to the web line and a seal is made between it and the film through contact with a fixed back-up platen above the web. Vacuum is drawn through the heated platen to bring the film into contact with the heated surface, to raise the temperature of the film to a level suitable for stretch-forming. At the end of the dwell cycle, this heated platen is lowered, and the film is indexed to the next station 54 where a water-cooled forming die 56 is brought up to the underside of the film.

Vacuum is applied to this die 56 to cause the heated film to be forced downward by atmospheric pressure and conform to the shape of the die cavity. The film is thereby stretched into a cup-shaped pocket 58 adapted to serve as a receptacle for the product. The die 56 preferably includes side troughs 56A adapted to stretch the side margins of the film more than the central regions, thereby to form the special ear-like elements, disclosed in U.S. Pat. No. 3,467,244, which extend along the sides of the product in the final package.

The shape of the formed receptacle 58 should be such as to allow the product to be placed into it and effectively locate the product for further operations. For bacon packaging, the die 56 is arranged to stretch the web, in the marginal regions at the periphery of the receptacle, to an appropriate depth, and with suitable contours, to permit each thermoformed receptacle to embrace all sections and contours of the bacon rashers (as illustrated in FIG. 5 of U.S. Pat. No. 3,467,244), taking into account the fact that the actual size and configuration of the shingled bacon varies somewhat from rasher to rasher. Thus, the receptacle should be formed to properly contain the most extreme bacon arrangement (i.e., extreme as to size and shape) which may be delivered from the slicing machine. The great majority of rashers, which are less extreme, will automatically be accommodated by the self-adjusting characteristic of the package, discussed subsequently.

As the web 34 emerges from the forming station 54 (FIG. 4), it moves out under a product loader 59 arranged automatically to deposit the sliced bacon into the receptacles 58. This product loader may be substantially the same as that shown in U.S. Pat. No. 3,354,613, and thus will not be described in detail herein. It may be noted, however, that in such a loader, the advancing movement of the product conveyor is continuous, but its speed is varied, synchronously with the operation of the intermittent-motion web-conveyor 36, in such a way as to insure that the product speed matches the receptacle speed at the instant of transfer.

Figures 4, 23, 23A:
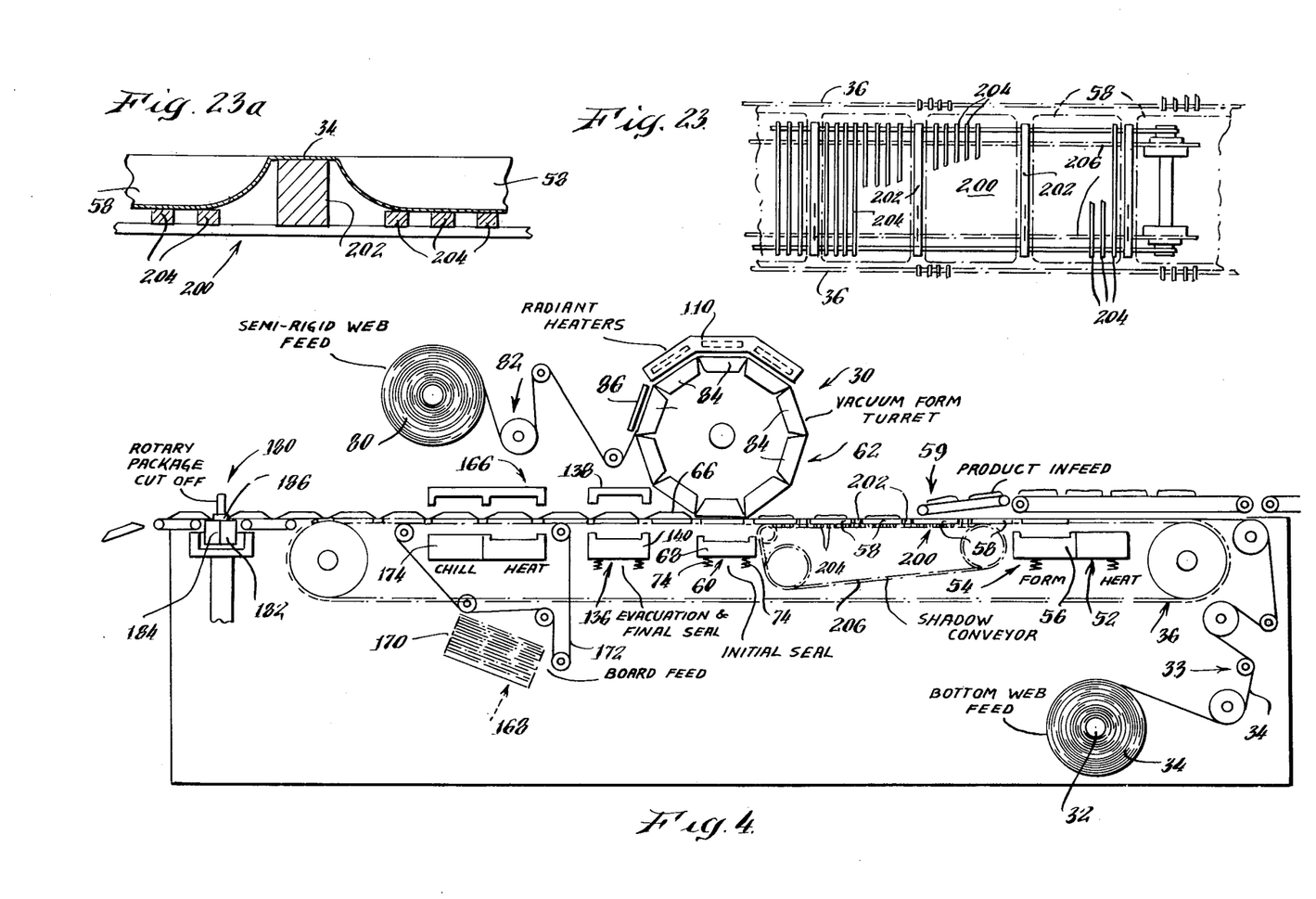
FIG. 4 is a diagrammatic elevation view of the principal operating components of the machine.
FIG. 23 is a plan view of a portion of the support means beneath the loaded receptacles.
FIG. 23a is a side view of a portion of the support means beneath the loaded receptacles.
Figure 5:
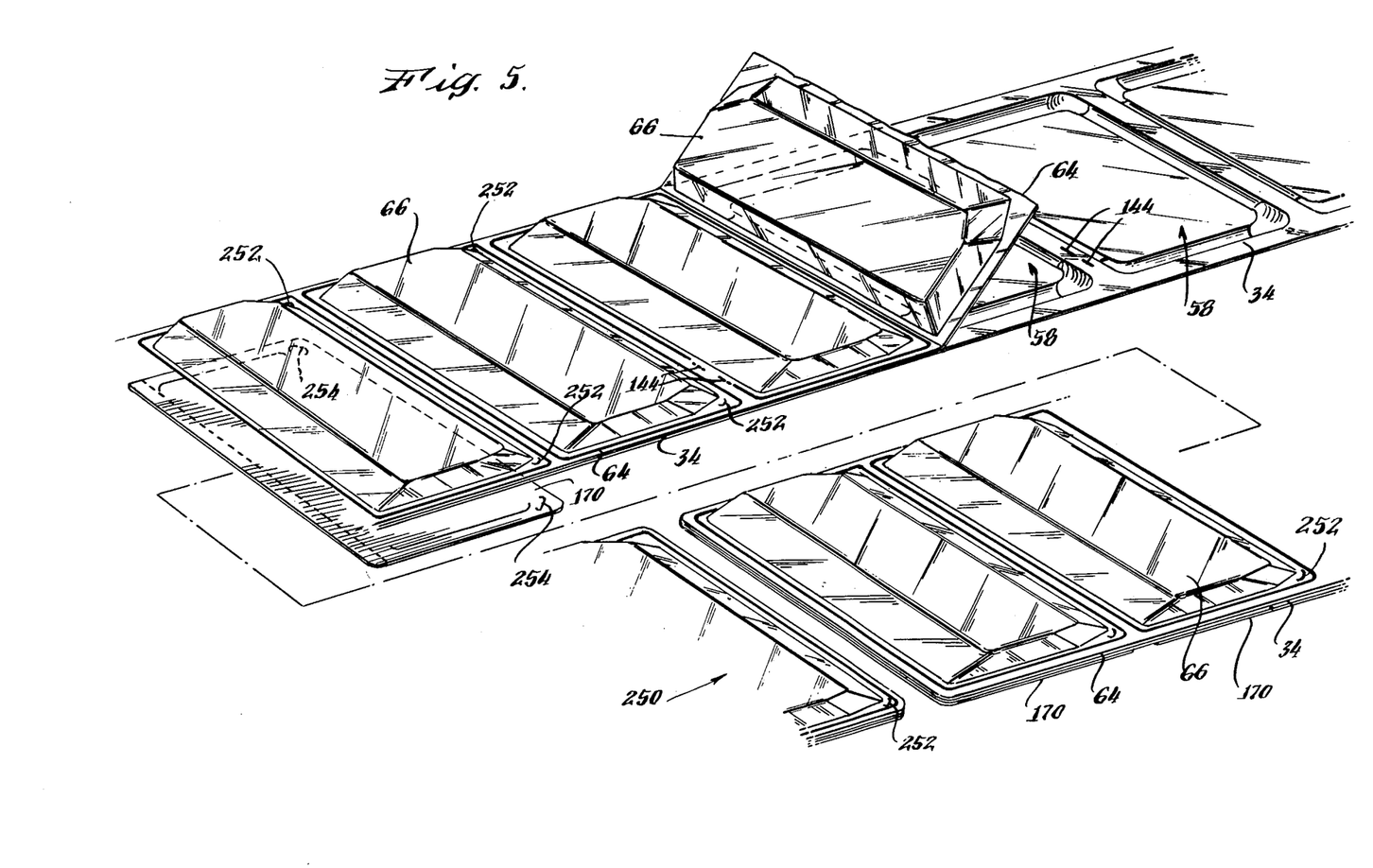
FIG. 5 shows in perspective the two webs of packaging material advancing through the machine.

The loaded receptacles 58 are indexed to the left, along the horizontal path of movement of the chain conveyor 36, to a package assembly and initial seal station 60. Immediately above that station is a rotatable, multi-faceted drum or turret 62 which delivers to station 60 a continuous web 64 of heavy-gauge plastic formed into semi-rigid containers 66 (see also FIG. 5) adapted to mate with the formed receptacles 58 to completely enclose the product to be packaged.

Figures 13, 14, 15:
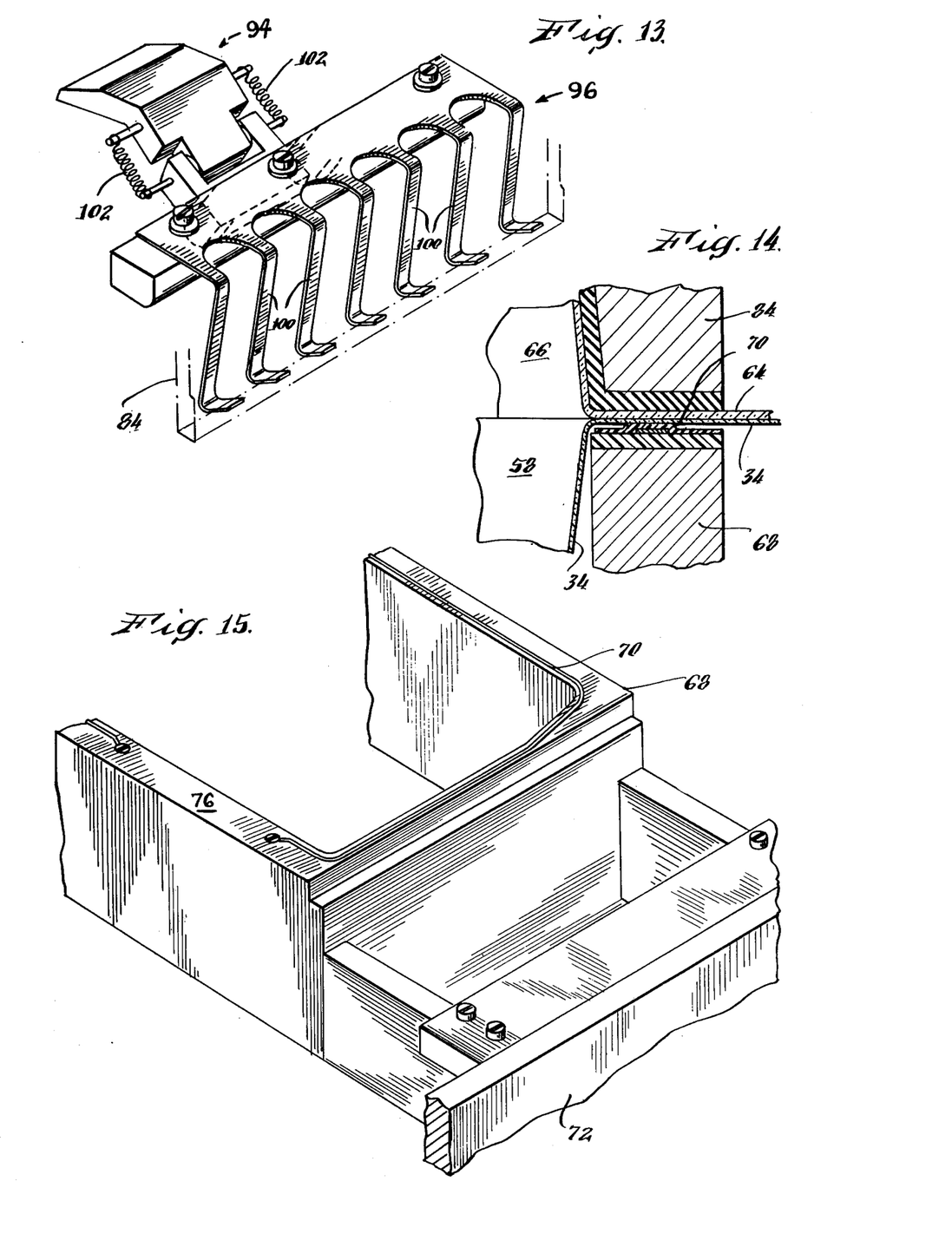
FIG. 13 is a perspective view of the clamp fingers for the turret.
FIG. 14 is a detail section showing the initial seal arrangement.
FIG. 15 is a perspective view showing the initial seal outline.

The assembly station 60 includes a vertically-reciprocable initial seal member 68 (see also FIGS. 14 and 15) carrying an impulse-type seal element 70. This seal member is moved up during the dwell period by a lower reciprocating bed 72. (This lower bed also serves to reciprocate the various other movable packaging components located beneath the web line.) At the end of the up-stroke, the seal member 68 is pressed up against the lower web 34 by internal spring-loading (illustrated in FIG. 4 at 74). The impulse seal element 70 then is activated to apply to the flange areas surrounding the lower receptacle 58 sufficient heat to seal them to the flange areas of the semi-rigid containers 66 around the entire periphery, except for one region 76 through which the package is to be evacuated.

The turret 62 is drivingly connected to the conveyor 36 by a series of coupling elements 78 which engage the conveyor chain. Thus, the turret is rotated with an intermittent indexing movement exactly synchronized with that of the horizontal conveyor. As the turret rotates, it receives the semi-rigid plastic film 64 from a roll 80 which is unwound by a conventional web-feed mechanism 82, e.g. identical to the lower web-feed 33.

Figure 9:
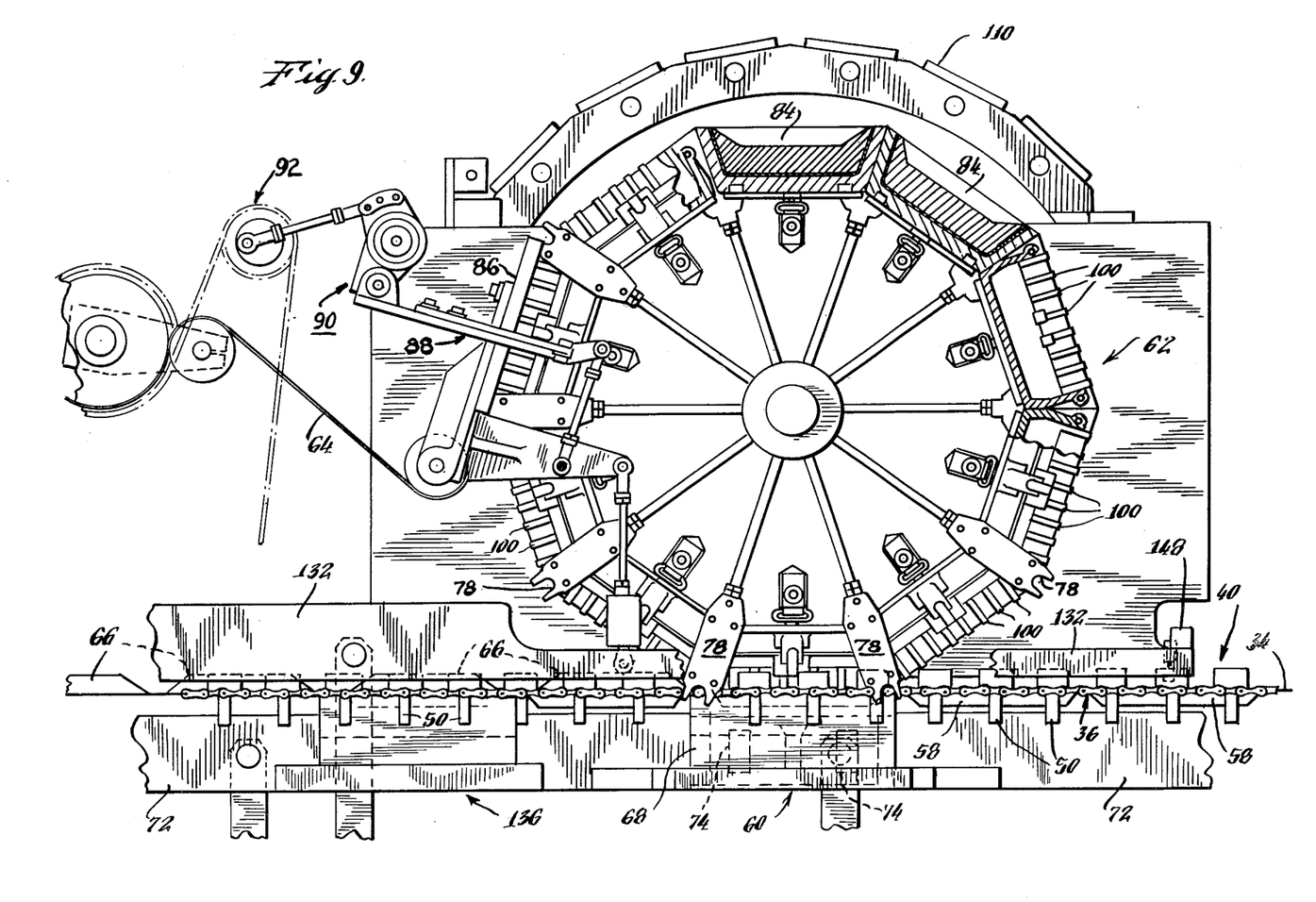
FIG. 9 is a vertical section showing details of the rotatable turret.
Figure 10:
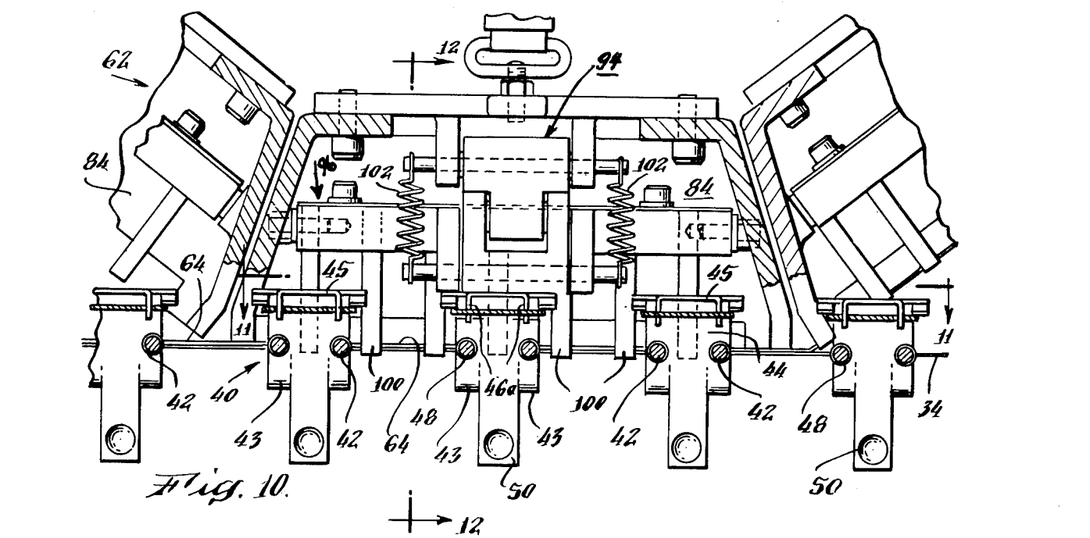
FIG. 10 is a detailed vertical section at the package assembly station.

Referring now also to FIG. 9, it will be seen that the turret 62 is provided around its periphery with a series of forming dies 84 (ten, in this embodiment) the cavities of which are shaped to match the configuration of the preferred container 66. During each indexing step, an empty die moves into position under a fresh portion of the web 64. At the start of the following dwell period, a pressure plate 86 is swung down to press the web into proper position over the die. Thereafter, a pair of toggle-actuators 88 adjacent the sides of the turret 62 are thrust forward by a control mechanism 90 (including a chain-driven eccentric 92) so as to actuate corresponding toggle linkages 94 (one set on each end of each die). These toggle-linkages in turn shift corresponding die clamps 96 into position to hold the web tightly over the die.

The die clamps 96 comprise a set of spaced, parallel, elongate and springy clamp fingers 100 (see also FIG. 13) the tips of which are curved over to a position to be pressed tightly against the turret frame alongside the side wall of the die 84. The toggle-linkage 94 is an over-center mechanism, with springs 102 arranged to develop in the closed position a force pressing the clamp fingers against the turret frame, so as to pin the edge of the web tightly in position overlying the die. In the open position of the linkage 94, the springs 102 serve to hold the clamp fingers away from the die.

The plastic web 64 is carried by the indexing movement of the turret 62 beneath a retractable radiant heater 110 which, in three successive die stations, heats the plastic to forming temperature. After indexing from under the heater, vacuum is applied to the die cavity under the film, stretching the heated film down against the walls of the cavity. The vacuum is maintained during subsequent indexing, to assure that the film cools sufficiently in its proper shape. The vacuum to the dies is controlled by a rotary slide valve (not shown) adjacent the hub of the turret, and to which all of the die cavities are connected by suitable vacuum lines. Each die also is water cooled. Vacuum and water connections are made automatically to the die when the die is secured in place on the turret, as by means of a quarter-turn fastener.

Thermoforming dies must provide certain characteristics in order to perform their intended function properly. For example, the dies must have an interior profile corresponding precisely to the part to be formed, and the surfaces must be capable of withstanding considerable heat from the web, without sticking to the web. The heat of the web also must be absorbed quickly, so as to cool the film to setting temperature. In the areas where heat seals are to be made after forming, the die should be covered by an unbroken resilient sealing back-up material. In addition to these generally fundamental requirements, the dies should be adapted for quick and easy replacement, and should be reasonably economical to manufacture. Moreover, the dies advantageously should be capable of forming relatively complex shapes (such as the trapezoidal container 66 of FIG. 2), with a highly transparent, blemish-free film surface, to enhance the customer's ability to inspect the product.

Figure 21:
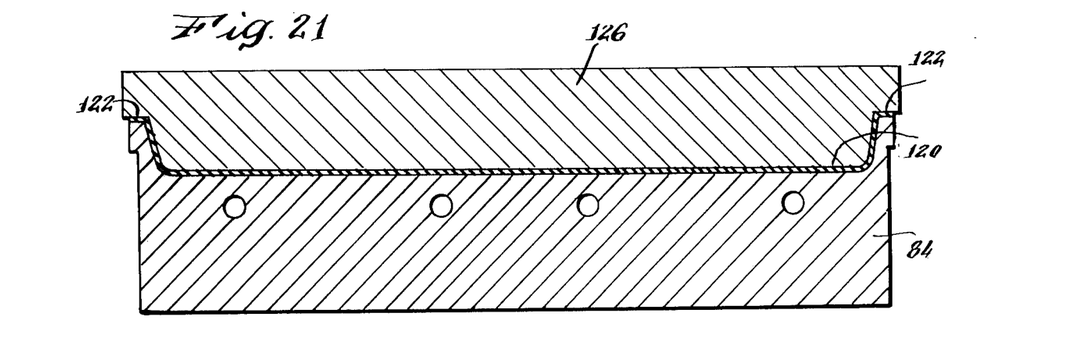
FIGS. 21 and 22 are vertical section views of a turret die.

These desirable results are achieved in accordance with one aspect of the present invention by molding to the surfaces of the dies 84 a thin layer of resilient material 120, e.g. silicone rubber, integrally extending throughout the cavity region, and also over the flange surfaces where the rubber serves as a heat-seal back-up bead 122 (FIG. 21). The rubber covering is molded to the precise interior dimensions required. The metal (aluminum) surfaces of the die, beneath the rubber, thus need not be held within close tolerances, and may be as-cast, or rough-machined, for example to a tolerance of ± 1/64 inch. The rubber layer 120 is sufficiently thin to conduct heat rapidly from the formed web to the metal of the die, where the heat is further dissipated by water cooling. The rubber thickness may, for example, be between 1/16 inch and 3/32 inch.

The rubber bead 122, on the flange surfaces, should (for the disclosed package) be effectively planar, e.g. flat within 0.005 inch (total indicator reading), and parallel to the back surfaces of the die. The bead particularly should be free of nicks, holes and foreign matter. The rubber within the cavity may be formed with small holes communicating with the chamber 124 beneath the die cavity (which chamber is supplied with vacuum by the rotary slide valve at the appropriate time in the sequence of operations), in order to vacuumize the die to draw the heated web into the cavity by atmospheric pressure.

Figure 22:
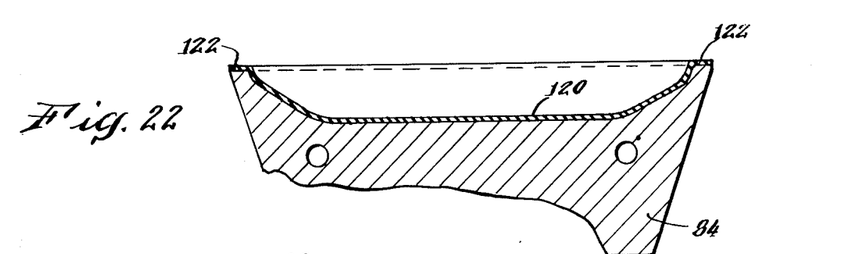

The rubber layer 120 may be molded directly into the die cavity by various techniques. For example, a quantity of rubber may be deposited approximately in the center of the cavity, and a precisely machined core member (illustrated at 126) pressed into the cavity, together with application of heat, to compress the rubber and force it over all of the die surfaces including the flange areas around the cavity. The metal surfaces of the die should, before depositing the rubber, have applied thereto an adhesive composition to effect a bond between the metal and the silicone rubber. The bond should have a strength exceeding the tear strength of the rubber.

The core member 126, made for example from aluminum, is precisely machined to match the exact contours of the part to be formed, i.e., container 66, in this case. It may be noted that only one precision machining operation is necessary, since the single core can be used for a number of dies. Thus this arrangement avoids costly machining operations required in prior types of dies wherein bare metal surfaces are presented to the hot drawn web. The disclosed arrangement also is superior to the use of thick die-filler blocks which, for example, do not conduct heat away at a sufficient rate to be satisfactory in many applications, such as in forming semi-rigid film.

Moreover, in the present arrangement, if any part of the bead 126 becomes damaged, or for any reason requires repair, the entire rubber covering may be stripped and replaced. The desired interior contours, dimensions, and surface finish result from the original mold which need be machined only once. The result is a very satisfactory and economical die construction.

Returning now to the operational description, the indexing movement of the turret 62 brings each semi-rigid container 66, completely formed, into register with a corresponding loaded receptacle 58 at the assembly station 60. The container 66 is brought down at an angle with respect to the horizontal web line, and moves into station 60 simultaneously with the associated loaded receptacle 58, so that there is no interference between the two even when the product extends above the flange regions of the receptacle 58.

During the indexing movement, the coupling elements 78 force the chain 36 downwards a small distance. The chains are supported by spring-loaded mounts to accommodate this motion.

At the end of the indexing movement, the flanges of the upwardly-facing receptacle 58 and the flanges of the downwardly-facing container 66 are parallel and effectively in the same plane, prior to sealing as described above.

Figure 11:
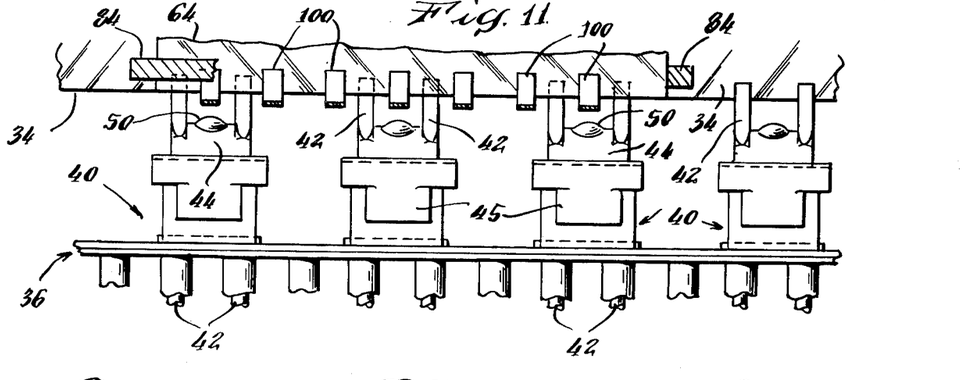
FIG. 11 is a horizontal section, taken along line 11—11 of FIG. 10, showing the interleaved relationship of the two sets of clamps.
Figure 12:
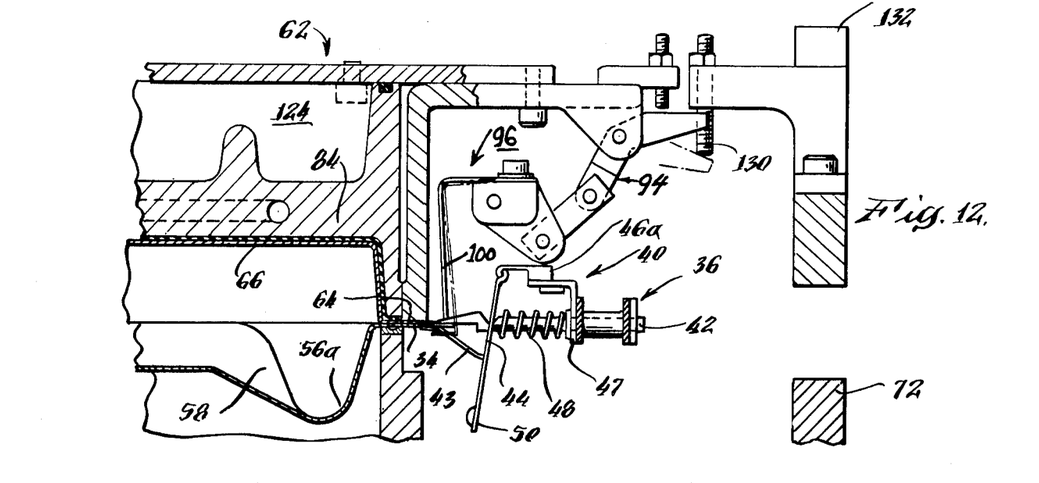
FIG. 12 is a vertical section, taken along line 12—12 of FIG. 10.

Important to successful sealing is the positive positioning of both webs by the respective clamps 40 and 96. Thereby, accurate control over the webs is assured to provide that the two sets of formed pockets are correctly related when sealing takes place, resulting in a good seal, particularly without problems from wrinkling. As shown most clearly in FIGS. 11 and 12, the clamp elements 42, 43 and the clamp fingers 100 are interleaved, in staggered fashion, along the main machine direction (i.e., parallel to the edge of the web 34) to allow concurrent, continuous gripping of both ends, yet without any mechanical interference between the respective components.

During the dwell period, the sealing member 68 is brought up to press the two webs 34 and 64 against a die 84 of the turret 62, and once the sealing member is seated, its spring-loading force against the die positively holds the two webs tightly in position for the sealing operation. Accordingly, referring to FIG. 12, at this time the clamp fingers 100 are released from engagement with web 64. This release is effected by a stud 130 carried by an upper bed 132 of the vertical reciprocation mechanism of the machine, and which is reciprocated (by drive linkages shown in FIG. 3) in synchronism with the lower bed 72 (see above) but opposite thereto, with both beds being maintained horizontal at all times.

At the end of the dwell period, i.e., after partial or preliminary sealing has been completed between receptacle 58 and container 66, the seal member 68 is retracted downwards. The partially completed package then is indexed two steps to the left where it is engaged by the operating elements of an evacuation and final seal station 136. These elements comprise upper and lower vacuum chambers 138, 140 which are moved by beds 72 and 132 into position surrounding and sealing off the package assembly from outside atmosphere.

Figure 19:
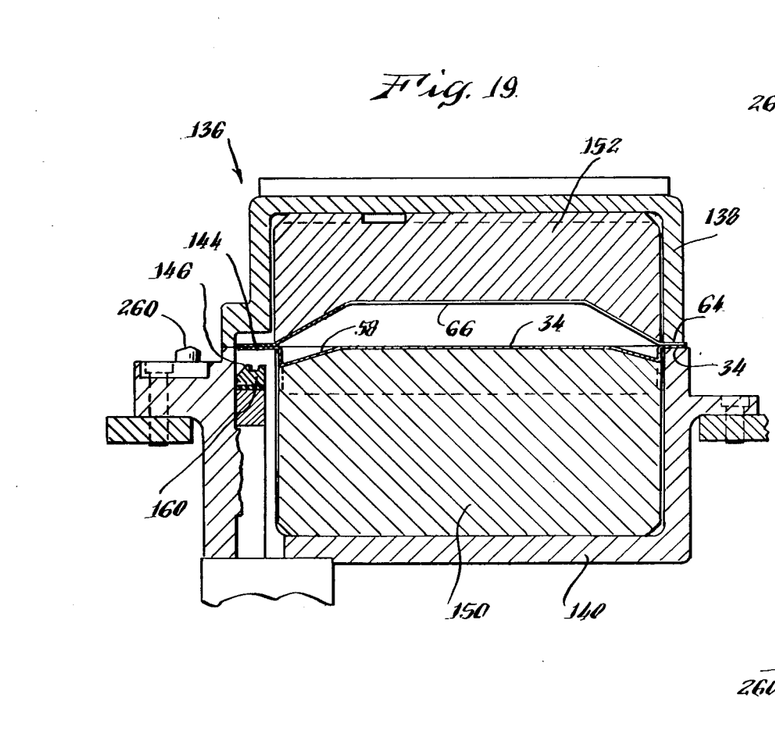
FIG. 19 is a detailed vertical section showing aspects of the evacuation chamber.
Figure 20:
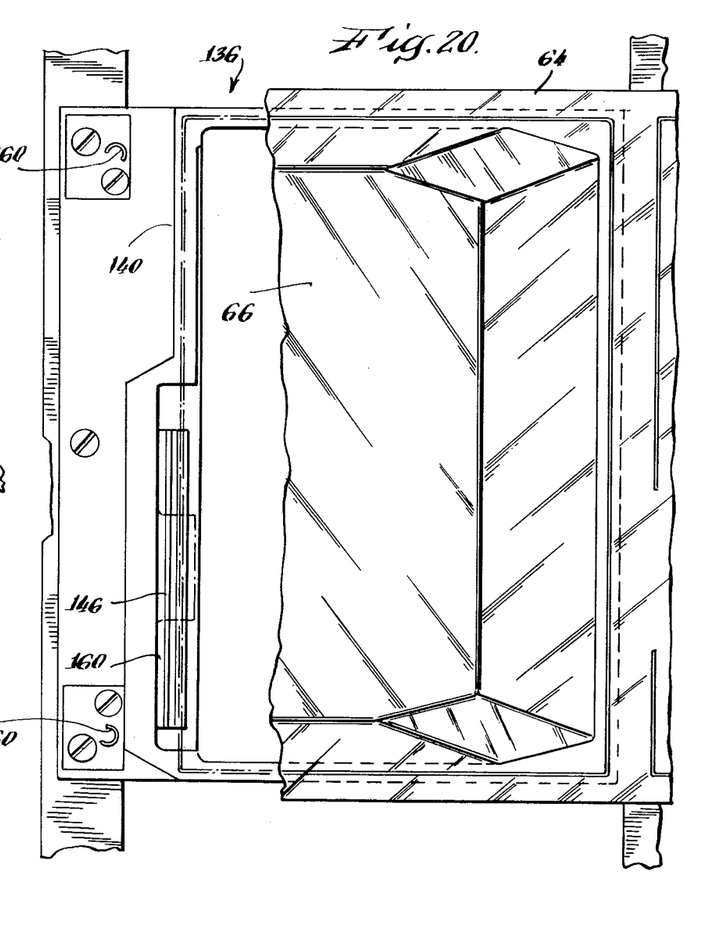
FIG. 20 is a detailed horizontal section showing the outline of the lower evacuation die.

The chambers 138, 140 are both connected in common to a vacuum valve 142 which, when the chambers are in closed position, is actuated by cam mechanisms to evacuate above and below the package. The interior of the package also is evacuated through a previously-formed evacuation slot 144 (see FIG. 19) in the lower web, the air exiting through a passage 146 forming part of the lower vacuum chamber, and communicating with the main vacuum line to that chamber. The evacuation slot is formed in conventional fashion by a slitting knife 148 (FIGS. 3 and 7) carried by the upper bed 132 in a position just preceding assembly station 60.

The lower vacuum chamber 140 contains a die-filler 150 (FIG. 19) which forces the receptacle 58 and the product up towards the container 66, preferably positioning the product very near to the top of the container. This elevation of the product prior to evacuation has been found to be highly desirable and effective in achieving high performance capabilities. The upper vacuum chamber 138 also contains a die-filler 152 which matches the shape of the semi-rigid container. Both die-fillers reduce the amount of air which must be drawn out during evacuation.

At the end of the evacuation cycle, gas may be introduced to the package through a gas tube (not shown) leading to a region adjacent to the evacuation passage 146.

When evacuation or gassing has been completed, the evacuation slot is sealed shut by a reciprocable, heated final seal platen 160, is an arrangement somewhat similar to that shown in U.S. Pat. No. 3,524,298.

After sealing, both chambers 138, 140 are vented to atmosphere. Preferably the lower chamber is vented first, followed a short time later by venting of the upper chamber. The atmospheric pressure forces the lower film 34 up against the product, whereby pressing the product against the upper surface of the container 66 with a force dependent upon the degree of evacuation and the extent of gas-filling, if any. The flexible lower film is tightly forced into the container interior, extending down along the side walls of the container, and filling any void areas which may remain between the product and the container walls. The preforming of the lower web 34, to make the pockets 58, provides the necessary stretched marginal film regions, i.e., immediately inboard of the container walls, to assure a good close fit.

It particularly may be noted that with this arrangement, the volume of the package automatically adjusts to the volume of the product, thus assuring consistently good packages even where there is considerable variation in product size or contour, from unit to unit, as there particularly is with sliced bacon.

After the vacuum chambers 138, 140 have separated, at the end of the dwell period, the package continues to index on its horizontal path until it reaches a board-application station 166. Below this station is a board magazine 168, containing a stack of stiff, flat cardboard elements 170 which are lifted, one at a time, by a chain-feeder 172 and carried up to station 166 for application to the package to serve as a stiff protective member adjacent and parallel to the formed flexible film portion 58. The board is positioned in register with the package, and during the dwell of the machine a heat seal bar is brought up from underneath to activate a heat seal coating on the board, so as to seal the board to the flexible web entirely around the periphery of the package.

After the board is sealed to the film 34, the clamps 40 are momentarily opened and then closed, to allow the clamps to grip the semi-rigid web and the board as parts of the complete package assembly. At the station next after the sealing station, water-cooled member 174 is brought up against the sealed region of the board to cool the board and set the sealant prior to further processing.

Completed packages are indexed further to the left and, near the end of the upper reaches of the conveyor 36, the clamps 40 are again ramped open to release the line of completed packages. Continuing movement of the unreleased packages pushes the released packages forward, aided if necessary by a small auxiliary conveyor beneath the web line. The released packages are thereby moved into a cut-off station 180 (FIG. 16) where the packages are severed from one another, and simultaneously the package corners are trimmed with a smooth round curve. This cutting operation is performed by a rolling cutter drum 182 formed on its peripheral cylindrical surface with a cutting edge 184 the ends of which are bifurcated to define rounded curves for the corner trimming.

Figure 16:
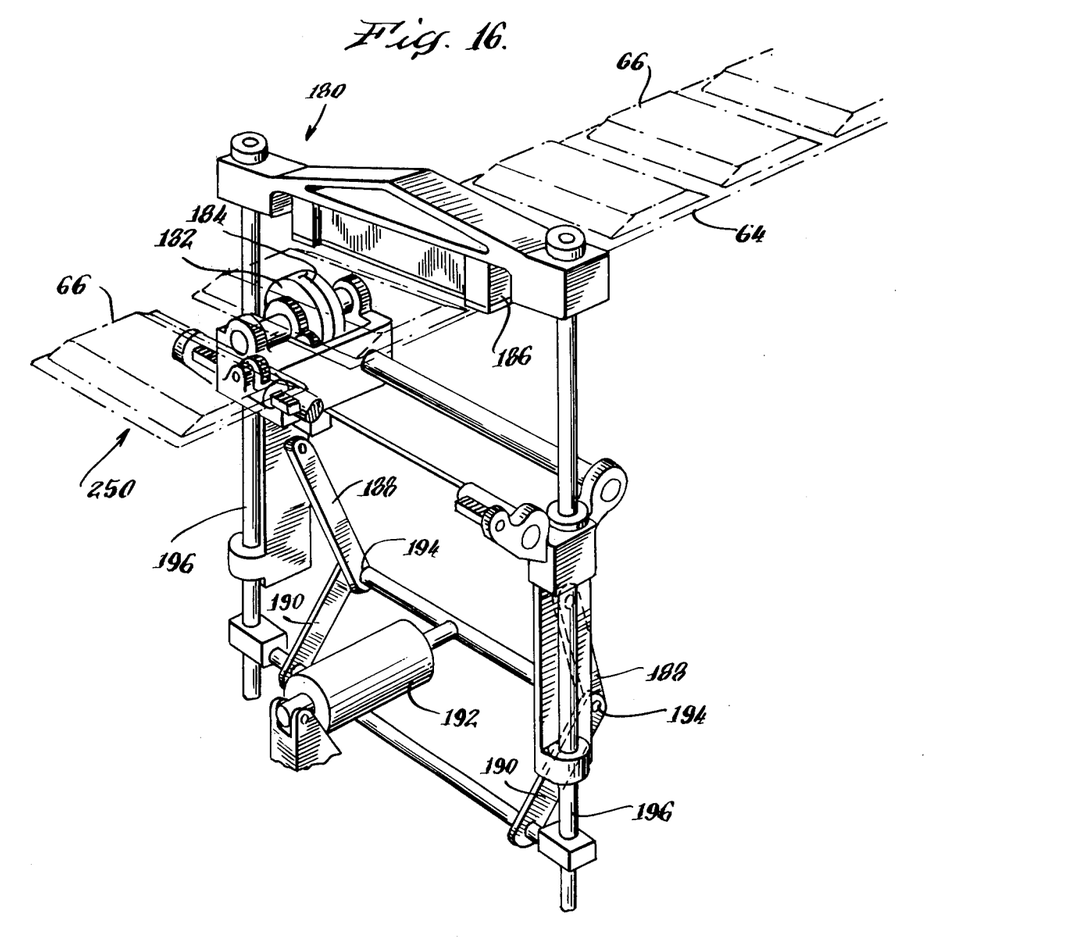
FIG. 16 is a perspective view of the package-severing mechanism.
Figure 17:
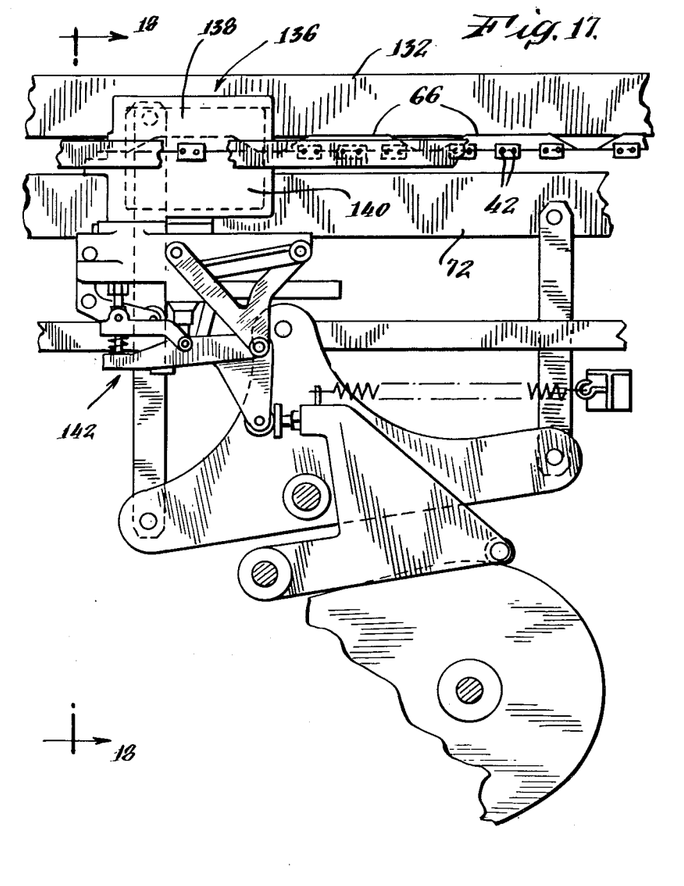
FIG. 17 is a vertical section showing elements of the evacuation and final seal stage.
Figure 18:
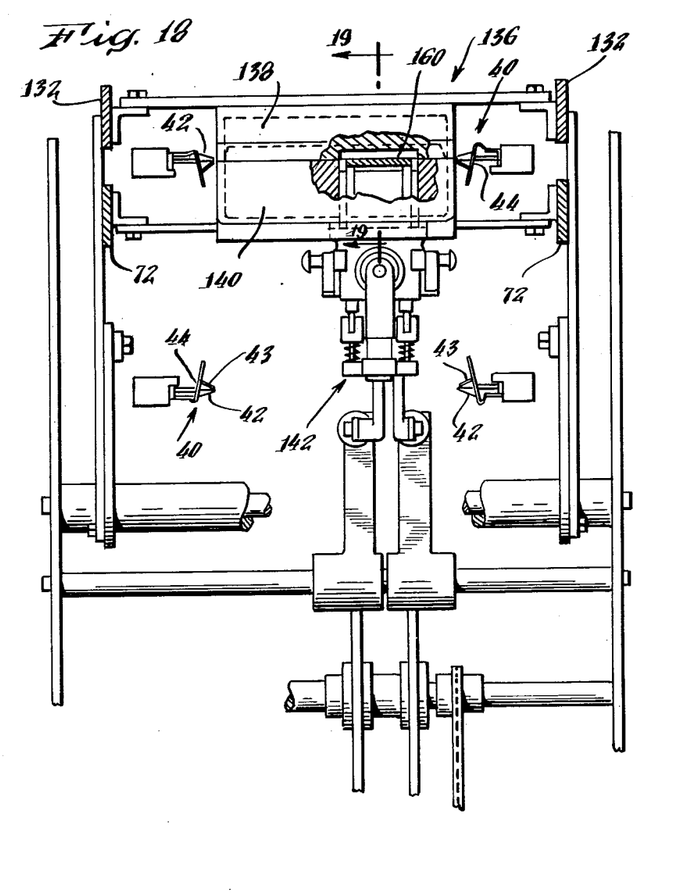
FIG. 18 is a vertical cross-section taken along line 18—18 of FIG. 17.

At the start of the dwell period, a back-up platen 186 is reciprocated down into the flange area of the upper web 64, between adjacent containers 66. This reciprocating motion is produced by a linkage mechanism including two links 188, 190 and an air-cylinder 192 which moves the link coupling 194 to the left to force the links to a substantially vertical lock position. This movement pulls down the support shafts 196 for the platen 186, and at the end of the movement the platen is locked in place (due to the positional relationship of the links) to permit the application of great cutting force without significant deflection of the opposed parts.

Once the linkage mechanism 188, 190 has been locked in position, conventional means (not shown in detail) are actuated to roll the cutter 182 in a cross-machine direction, under the flange area between two packages, so that the cutting edge 184 bites through the two webs 34 and 64 to sever the package. The backing board is preformed with curved corners, so that it is not cut at this time. The severed packages may be fed out of the machine by conventional conveyor means.

For machines of the type described which are to be operated at relatively high speed, e.g. 40 or so indexes per minute, there may be a tendency for the product to slip out of the receptacle 58 prior to the initial seal station 60, due to acceleration and deceleration at each index. This may particularly be a problem where the pockets 58 have a depth less than the product height, an arrangement which is desirable in order to avoid over-thinning of the plastic film. It also may particularly be a problem with slippery products, such as bacon, especially where the edges of the pockets 58 slope gently in the machine direction, thereby giving a somewhat ramp-like formation where the product can slide too easily. In addition, there can be a problem with relatively heavy products which cause the formed pockets 58 to sag, and develop a pendulum-like swinging as the indexing motion stops and starts at high speed.

To avoid such difficulties, the machine 30 may with advantage be provided with special means to engage the loaded pockets 58 and prevent or minimize relative movement between the product and the receptacles. In the present embodiment (referring now to FIGS. 4 and 23), there is provided beneath the loaded receptacles 58 a conveyor-like product control structure generally indicated at 200, and comprising a train of elements including a set of main crossbars 202 located directly beneath the flange areas of the web 34, and intermediate sets of support slats 204 located beneath the pockets 58. This train of elements is carried by a pair of chains 206 driven in synchronism with the chain conveyor 36.

The main bars 202 extend up into the region alongside of the vertical end walls of the pockets 58, and serve as barriers to any movement of the contained products, in the machine direction, relative to the movement of the conveyor 36. Thus, the products are kept positively within the confines of the cavities defined by the pockets during the passage of the loaded pockets to the assembly station 60. Also during this time, the lower support slats 204 prevent the bottom of the pockets from sagging significantly, under the weight of the product.

The product control structure 200 terminates adjacent the assembly station 60, because of the presence of the initial seal member 68. To prevent excessive product movement within the assembly station position, as the indexing movement stops, the initial seal member may be provided with additional special means which restrains forward motion of the product at the end of indexing, without interfering with subsequent forward movement of the partially assembled package after the initial seal has been completed.

Figure 24:
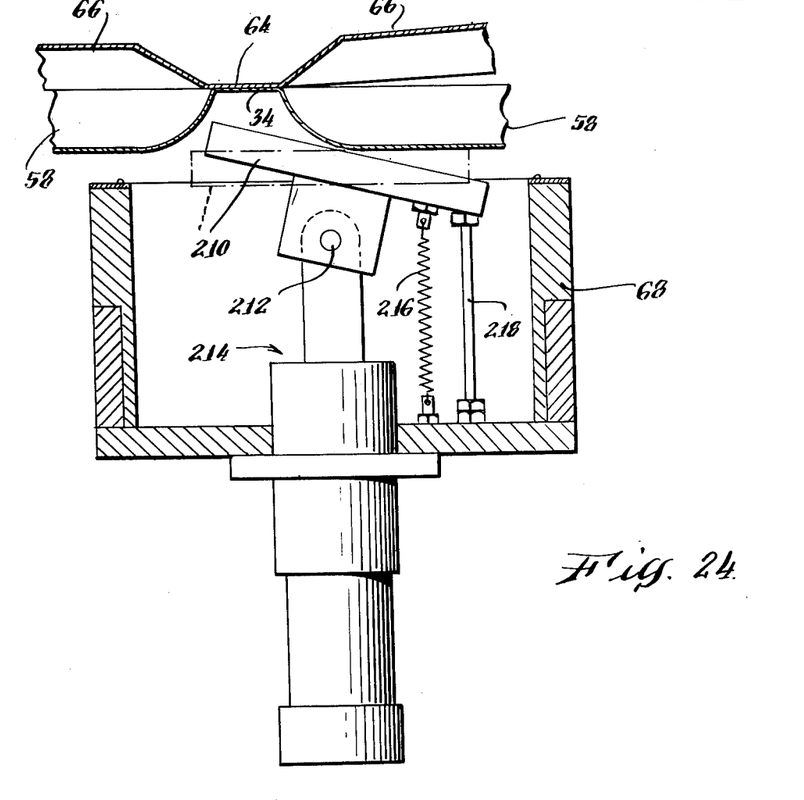
FIG. 24 is a vertical section showing the product control plate in the initial seal member.

Referring now to FIG. 24, a preferred embodiment of such restraining means comprises a platen 210 pivotally mounted at 212 on the top of a vertical support 214 which is integral with the seal member 68, i.e., so that the two reciprocate together during the dwell period. This plate 210 is urged in clockwise direction by a spring 216 and, during indexing movement, takes the tilted position shown, against a stop 218.

A product-filled pocket 58 is shown in FIG. 24 approaching the assembly station 60, that is, in a position partway through the indexing movement. Since the pocket has left the support control structure 200, its bottom will sag somewhat, under the weight of the product. The plate 210 is so positioned, vertically, that a portion of the plate is located above the lower surface of the filled pocket 58. Thus, as the pocket indexes into the station 60, it will strike the plate and tend to rotate it counterclockwise against the spring 216, ultimately repositioning the plate in horizontal condition.

This rotation of the tilted plate 210 against its spring loading absorbs energy from the advancing product, and thereby tends to prevent forward movement of the product beyond the movement of conveyor 36. Thus the product is prevented from sliding up into the area of the flanges forward of the pocket 58. Once the seal has been made, there is no possibility of product movement out of the pocket during subsequent indexing.

For some applications, it may be desirable to arrange the support 214 for vertical movement, e.g. by utilizing a telescoping or piston construction for the support. Thus, if the product weight is sufficient, the support can move down a short distance prior to, or simultaneously with, the upward movement of the sealing member 68.

The presently preferred bacon package 250 shown in FIG. 2 comprises the semi-rigid, transparent container 66, serving as the display top for the package, the flexible back-formed plastic cover film 34 (hermetically sealing the evacuated interior), and the flat, stiff cardboard protective member 170, as the base of the package. The seal between the board 170 and the flexible film preferably is stronger than the seal between the flexible film and the container 66, in order to enhance the customer's ability to open the package by breaking the seal between the two plastic films, using the backing board to aid in applying a pulling force to the flexible film.

One advantageous way of opening the package is to break the seal between the two plastic films along the two short sides and one long side, and then pivot the top back along a line adjacent and parallel to the remaining, unbroken seal line to gain access to the bacon. After the package has been opened, and a portion of the bacon removed, the remainder of the bacon can be placed, or left on the composite board/film (still sealed together as a unit), with the top swung back into place covering the product. Thus the remaining bacon is still protected on all sides by relatively rigid elements, and the composite board/film unit can act as a serving base or platter for the remaining portion of the product.

To insure that the top stays firmly in place after the seal is broken, and the package subsequently reclosed, the flange corners of the semi-rigid container 66, and the film 34, are slit at 252 to receive a tab 254 (see FIG. 5) pre-formed in the corresponding corners of the board 170. The tabs can be pressed out and inserted up through the slits 252 after the cover 66 has been swung back down over the product. The side walls of the cover 66 are slightly angled at 256 to provide sufficient area for the reclosure slits.

These slits 252 are cut through the two webs 34 and 64 by knives 260 carried along the lower evacuation chamber (see FIG. 19), and which cooperate with corresponding elements moving down from above to effect an arc-shaped cut readily adapted to receive the cardboard tab 254.

The machine disclosed can be used to make other types of packages. For example, the machine can make packages of two convexly thermoformed webs of flexible packaging material, i.e., by using the turret 62 to make pockets from flexible film rather tha semi-rigid film. The machine also can be used to make packages of two convexly formed webs of semi-rigid material, or the lower web can be semi-rigid and the top web flexible, if desired.

For some applications, the two convexly-formed pockets could each be drawn with suitable depth and contour to receive and contain a corresponding segment of the product, e.g. the upper half of the product contained in the upper pocket, and the lower half of the product in the lower pocket. With such an arrangement the sealing flange line is located half-way between the top and bottom of the package, rather than, as in the disclosed package, at the very bottom of the package. In such a modified package, the combined depth of the two opposed pockets advantageously would be so dimensioned as to provide slightly more volume than required for the maximum-sized article to be packaged, i.e., where the article size varies, as with bacon. Such a package normally would be made of all flexible material, although it is possible to make such a package using semi-rigid material for one or both of the opposed pockets. It also is possible to make vacuum packages with one flexible and one rigid web wherein the flexible web in its final position may lie partially above and partially below the web line.

Although preferred embodiments of the invention have been described hereinabove in detail, it is to be understood that this is for the purpose of illustrating the invention and should not be construed as necessarily limiting of the invention, it being well recognized that those skilled in the art may make numerous changes to suit different requirements while still practicing the invention claimed hereinafter. For example, although the particular turret arrangement described hereinabove is advantageous, and preferred, it is evident that other means can be devised to perform the basic required functions.

We claim:
1. Packaging apparatus comprising:
   means to advance a web of flexible packaging material;
   means to form said web into receptacles and to position said receptacles facing upwards to receive product to be packaged;
   means to position over the tops of said upwardly-facing receptacles, containers adapted to register with said receptacles;
   means to seal said receptacles and containers together around the peripheries thereof to form packages;
   means to elevate said receptacles, with the products therein, into respective containers; and
   means to evacuate and hermetically seal said packages.
2. Apparatus as claimed in claim 1, wherein said means to evacuate said packages comprises an evacuation chamber; and a die filler in the lower part of said chamber to engage the product loaded receptacle to elevate it into the spaces defined by said container.

3. Apparatus as claimed in claim 2, wherein said containers are formed of semi-rigid material shaped to match at least approximately the products in said receptacles.

4. The method of packaging comprising:
forming a receptacle cup of flexible packaging material;
placing a product in said receptacle cup and holding said receptacle with its opening facing upwards;
positioning a semi-rigid container over said filled receptacle, with the peripheries in register to define a package assembly;
elevating said receptacle cup and the product therein up towards said container to position the product within the spaces of said container and close to the remote surface thereof; and
evacuating and sealing said package assembly, the evacuation being carried to such an extent that atmospheric pressure, acting through said flexible material, presses said product up against said remote surface of said container.

5. A method for making a package in which two plastic sheet portions are secured together along peripheral edges to define a sealed container for a product between said sheet portions, said method comprising:
supporting and advancing a first continuous web of flexible packaging material along a generally horizontal path leading to a product-loading region;
stretch-forming said first web of packaging material, while it is in a region preceding said product-loading region, in a downward direction to make upright cup-shaped receptacles the mouths of which are generally in the plane of the surrounding web of material;
placing a product from above into the upright receptacles while in said product-loading region;
advancing said web beyond said product-loading region to a subsequent package-forming region;
supporting and advancing a second continuous web of packaging material, with a movement synchronized with the movement of said first web, down from a region above said first web to said package-forming region to be brought together with said first web so as to form complete packages containing said products;
pressing the bottom of the upright receptacles up, while in said package-forming region, to elevate the product loaded therein up above the plane of the mouth of the receptacle, the upward movement serving to engage the top of the product tightly with the opposite portion of said second web of packaging material serving as the inner surface of the package top; and
at some stage following the forming of the package in said package-forming region, evacuating the interior of the package and completely hermetically sealing each evacuated package, the top of the product in the final package being elevated above the mouth of the upright receptacle and into tight engagement with the top surface of the package as formed by said second web of plastic packaging material.

6. The method of claim 5, wherein said package-forming region includes a chamber having separate isolated spaces above and below the web of packaging material, respectively;
evacuating said spaces while evacuating the package defined by said webs;
sealing said webs to form a hermetically-sealed package;
venting one of said spaces prior to the other of said spaces; and
thereafter venting said other spaces of said chamber;
the sequence of venting of said spaces being selected to apply a net pressure up against the bottom of the upright receptacle to force the product tightly up against the upper web.

7. The method of forming an hermetically-sealed package comprising the steps of:
placing in a stretched-formed cup of flexible packaging material, having horizontal flanges around the cup opening, a product the upper surfaces of which are initially at least not substantially above said flanges;
securing a plastic top to said flanges to form a package;
evacuating the interior of the package while providing reduced pressure in a first evacuating space above the package top and in a second evacuating space beneath the package cup;
hermetically sealing the package;
sequentially venting said first and second spaces in a selected order developing an upward force against said plastic top with at least a portion of the upper surfaces of said product and the corresponding plastic top portions in contact therewith being above said horizontal flanges.

8. In a process for producing vacuum packaging comprising upper and lower sheets of packaging material sealed together around peripheral flanges with a packaged product therebetween, the interior regions of both sheets being formed outwardly in opposite directions, away from the peripheral flanges such that an upper segment of said product is above the flanges and a lower segment is below said flanges;
the improved method comprising the steps of:
placing the product with the adjacent two sheets of packaging material in an evacuation-and-seal chamber having separate isolated spaces above and below the packaging material;
evacuating said isolated spaces while evacuating the interior of the package;
applying sealing heat to said package material after evacuation of the packages has been effected; and
sequentially venting said spaces to atmosphere to develop an upwardly-directed force on the lower sheet of packaging material to push the product up against the upper sheet.

9. The method of claim 8, wherein both of said sheets are formed of flexible packaging material.

10. The method of claim 8, wherein the lower spaces are vented before the upper spaces.

* * * * *